Jan. 15, 1963   J. CUNETTA ETAL   3,073,453
SLUDGE PUMPING SYSTEMS
Filed Feb. 18, 1960
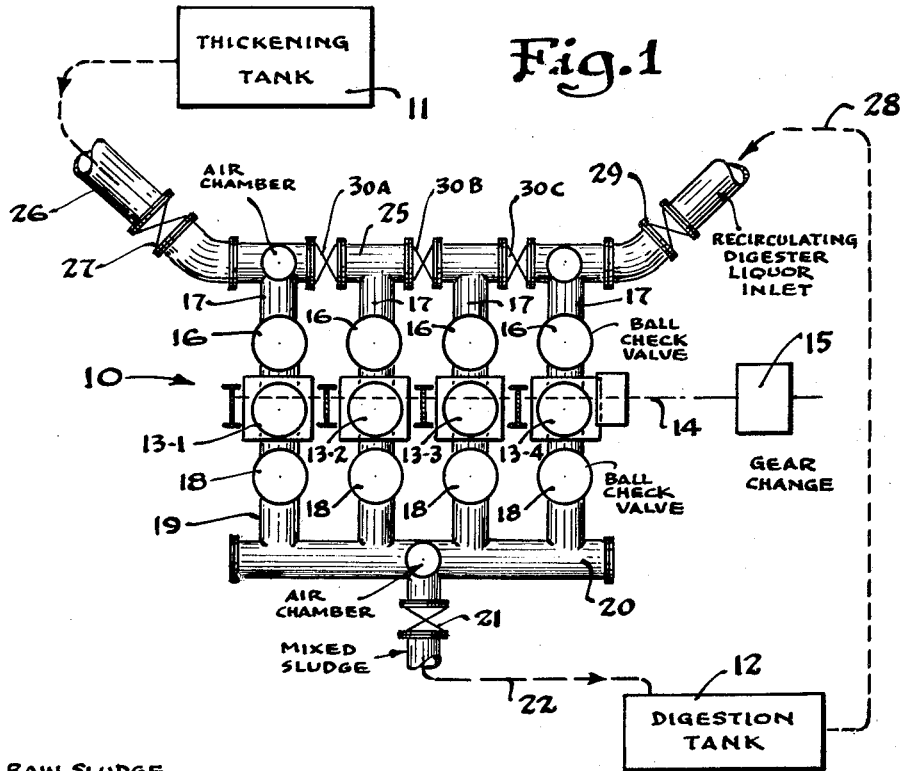
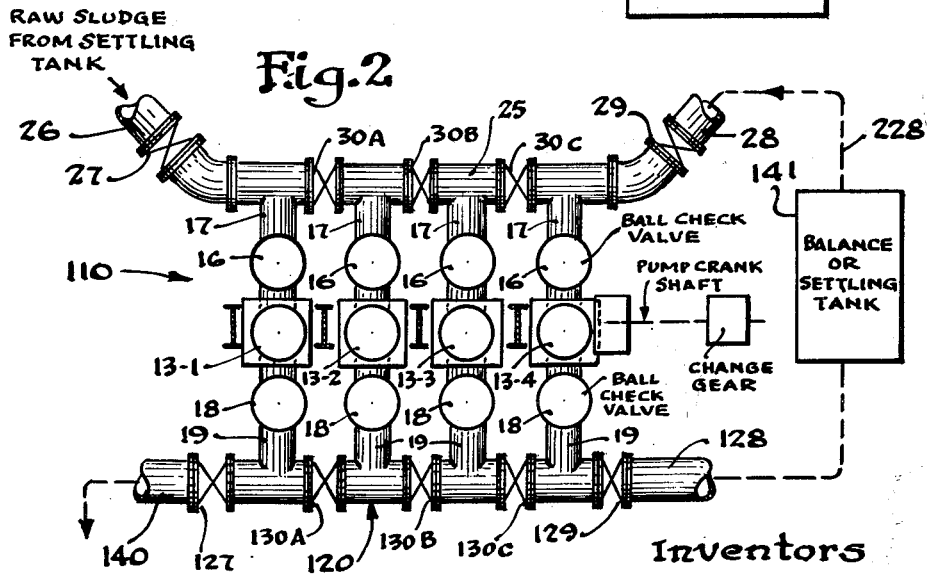
Inventors
Joseph Cunetta
Nicola F. Lamantia
By Mann, Brown & McWilliams
Attorneys United States Patent Office 3,073,453
Patented Jan. 15, 1963

3,073,453
SLUDGE PUMPING SYSTEMS
Joseph Cunetta, 164 Parkside Ave., Brooklyn 26, N.Y., and Nicola F. Lamantia, 161 Prospect Park W., Brooklyn 15, N.Y.
Filed Feb. 18, 1960, Ser. No. 9,589
3 Claims. (Cl. 210—167)

This invention relates to sludge pumping systems, and particularly to the pumping of sludge or sludge-like materials in sewage processes, industrial waste or disposal processes and other chemical and industrial processes.

An instance where the pumping of the sludge is important and presents many problems is found in various systems of sewage treatment and disposal, and in such systems it is customary to use multi-cylinder plunger pumps that are equipped with relatively large inlet and outlet check valves for the several cylinders. Such plunger pumps operate quite satisfactorily when such operation is at the full rated capacity, and even down to about fifty percent of the full rated capacity, but where the delivery rate that is dictated by the attainment of maximum efficiency and economy in the process is less than about fifty percent of the rated capacity of the pump, the velocity of the sludge through the piping system and check valves is so reduced that the normal scouring or self-cleaning action is lost and there is a tendency to build up undesirable deposits within the piping system, and there is a marked tendency for the check valves to become clogged by the usual foreign material that is usually present in the sludge. This results in an unduly high maintenance cost.

In the pumping of sludge in sewage treatment and disposal installations the need for variation in the rate of discharge or pumping of the sludge may arise from different causes which tend to interfere with the efficient operation of the system as a whole. One such situation involves variations in the solids concentration of the sludge, and it may be pointed out that in order to maintain maximum efficiency in the digestion tank or tanks, the sludge should be fed to the digestion tanks in such a manner that the rate of supply of solids to the tank is substantially uniform. Hence, where the pump is operating at any particular output capacity, a substantial increase or decrease in the solids concentration of the sludge will tend to disturb the efficient operation of the digestion tank. It is under such circumstances that the sludge discharge rate of the sludge pump must be changed to conform to the different solids concentration of sludge.

Another situation where this need for varying the output of the pump arises is in connection with the thickening tanks where different conditions may cause undue growth or build up of the sludge blanket in the thickening tank, and it is found that when any such disturbance in the normal development of the sludge blanket is encountered, steps must be taken promptly to restore the proper operation in the thickening tanks by reducing the blanket thickness. This may be accomplished only by varying the rate of sludge withdrawal from the thickening tank and this in turn requires a change or different setting in the sludge output of the sludge pump.

The importance of matching the output rate of solids by the pump with the requirements of a particular sewage treatment system or the like is such that many efforts have been made to vary the operating speed of the pump or to control the output by the use of intermittent periods of pump operation by means such as a time clock control. As above pointed out, the variations in the pump output that are attained in conventional systems by changing the speed of operation of the pump are found to be unsatisfactory because of unduly high maintenance costs that result from the reduced flow rate, while the intermittent operation has been found to be unsatisfactory because the intermittent delivery of sludge usually causes inefficient operation of the sewage disposal system.

In view of the foregoing, it is the primary object of the present invention to provide the sludge pumping system and apparatus whereby the multi-cylinder plunger pump that is ordinarily used in situations of this kind may be continuously operated at an efficient and non-clogging rate, while at the same time, delivering the sludge at a constant but settable delivery rate that may be set as dictated by the solids concentration of the sludge. More specifically, it is an object of the present invention to enable sludge to be pumped in sewage disposal or like systems in such a way that maximum efficiency of the system may be maintained while at the same time reducing the problems of maintenance that are usually encountered in the pump and the related piping system.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawing:

FIG. 1 is a schematic view illustrating a sludge pumping system and apparatus embodying the features of the invention; and FIG. 2 is a schematic view illustrating a modified sludge-pumping system and apparatus.

For purposes of disclosure the invention is illustrated in FIG. 1 of the drawing as embodied in a four-cylinder reciprocating plunger pump 10 that is utilized for delivering thickened sludge from a thickening tank 11 to a digestion tank 12. The pump 10 embodies four piston and cylinder units 13–1 to 13–4 that are operated by a common crank shaft 14 driven from any suitable power source through a gear changer 15 which may provide for two or more operating speeds. Each piston and cylinder unit 13 has a ball check valve 16 disposed in an inlet pipe 17, and each unit 13 has a ball check valve 18 disposed in an outlet pipe 19. The multi-cylinder plunger pump 10 and its related inlet and outlet check valves may be of any conventional form that is adapted for the pumping of sludge.

Under the present invention, the pump 10 is endowed with a variantly settable output capacity whereby the output rate of thickened sludge from the tank 11 may be changed while at the same time maintaining the flow rate in the system at a value which prevents clogging of the valves 16 and 18 and prevents undesired deposits of material in the pump or the related piping system. In accomplishing this the outlet pipes 19 from the several piston and cylinder units 13 are connected to a discharge manifold 20 which in turn is connected through a shutoff valve 21 and a pipe 22 to the digestion tank 12.

Under the present invention the several inlet pipes 17 of the piston and cylinder units 13 of the pump are connected to an inlet manifold 25 which at one end is connected by a pipe 26 and a cutoff valve 27 to the thickening tank 11. At its other end the inlet manifold 25 is connected through a pipe 28 and a shutoff valve 29 to which digestion tank 12 and this connection is so arranged that digester liquor from the digestion tank 12 may be withdrawn and supplied to the inlet manifold 25 when the cutoff valve 29 is open.

Under the present invention the inlet manifold 25 has a cutoff valve 30A disposed therein between the inlets of the pump units 13–1 and 13–2; a valve 30B is disposed in the manifold 25 between the inlet of the pump units 13–2 and 13–3; and a valve 30C is disposed in the manifold 25 between the inlet of the pump units 13–3 and 13–4.

With the structure that is thus provided, the pump 10 may be operated so that all of the pumping units 13 thereof pump sludge from the thickening tank, or the valve system may be set so that digester liquor is pumped from the digestion tank 12 through one or more of the pumping units 13 while the remaining pumping units 13 withdraw sludge from the tank 11. Thus, liquid flow through the piping system and through all of the pump cylinders and all of the check valves is maintained at a rate which prevents build up of undesirable deposit therein and prevents clogging of the check valves. The speed change unit 15 is of such construction that at its lowest output speed, a self-cleaning flow rate will be attained in the pump 10. The unit 15 may, of course, be set for operation of the crank shaft and the pump unit at its full rated speed or at a lower speed so that with a four cylinder pump, such as the pump 10, more than four different sludge delivery rates may be established while maintaining efficient operation of the pump.

In the embodiment of the invention shown in FIG. 1, the sludge and the digester liquor are fed through the common discharge line 22 to the digestion tank, so that there is a recirculation of the digester liquor through those piston and cylinder units 13 that are not pumping sludge. Such an intermixture of the sludge with the digester liquor in the output line 22 is considered to be desirable, but in certain instances, digester liquor is not readily available. In FIG. 2 of the drawings, the invention is illustrated as embodied in a pumping system whereby the advantages of the pumping system of FIG. 1 may be attained in such situations.

Thus, as shown in FIG. 2 of the drawings, the invention is illustrated as embodied in a multi-cylinder plunger type pump 110 which is identical with the pump 10 shown in FIG. 1 insofar as the intake manifold, the inlet valves, and the piston and cylinder units may be concerned. In the pump 110, however, the output of the piston and cylinder units 13 is discharged into discharge manifold 120 which has a plurality of cutoff valves included therein. Thus the outlet manifold 120 has a valve 130A therein between its points of connection with the outlet pipes 19 of the pump units 13–1 and 13–2; a valve 130B is located in the manifold 120 between the outlet connections for the piping units 13–2 and 13–3; while a valve 130C is connected in the manifold 120 between the outlet connections of the pumping units 13–3 and 13–4.

In the embodiment of the invention shown in FIG. 2, a sludge discharge connection 140 is extended through a cutoff valve 127 from the end of the outlet manifold 120 that corresponds to the location of the sludge inlet connection 26. At the other end of the outlet manifold 120, an outlet line 128 is extended to a relatively large capacity balance tank 141 that is adapted to contain a secondary liquid such as water. The inlet pipe 28 is also connected to the balance tank 141 as by means of a connection 228 so that the liquid from the tank 141 may be pumped and recirculated through one or more of the pumping units 13 as determined by the setting of the various cutoff valves.

It is particularly important to note that in the pump system of the present invention, different sludge delivery rates may be established merely by setting of the several valves of the system, and such variation or change in the rate of sludge delivery does not in any way reduce the efficiency of operation of the pump, particularly in so far as balance, operation and self-cleaning characteristics are concerned. This enables the pump drive and control to be materially simplified so as to reduce the overall cost of the plunger pump units.

The pumping system of the present invention also increases the efficiency of operation of the disposal system in the various situations in which the present pumping system may be used.

For example, the efficiency of the digester system is improved by reason of the recirculation of the digester liquor which has a high content of biologically active seed material and which has a higher temperature than the sludge that is being pumped. In other situations, the present pumping system improves efficiency as for example in a sludge thickening process where by use of the present system the rate of thicker-sludge withdrawal may be coordinated with the other elements of the system. Similarly, the present pump may be utilized to intermix the primary sludge and aerator liquor so that this aerator liquor having a high oxygen potential may be fed into the thickening tank with the primary sludge where this is desired.

From the foregoing description it will be apparent that the present invention provides a sludge pumping system in which a multi-cylinder plunger pump may be continuously operated in efficient and non-clogging manner while delivering sludge at a constant but settable rate, thus to enable maximum efficiency to be attained in the process in which the pumping system is used. Furthermore, it will be evident that the pumping system provided by this invention enables the pumping of sludge to be properly coordinated with the varying conditions encountered in sewage treatment and disposal processes so as to minimize maintenance and promote efficiency of operation of the processes.

Thus while we have illustrated and described preferred embodiments of the invention it is to be understood that changes and variations may be made by those skilled in the art without departing from the spirit and scope of the appending claims.

We claim:

1. In a sewage treatment system wherein optimum operating efficiency of the system is dependent upon continuous feeding thereto of thickened raw sludge at substantially a constant solids delivery rate from a sludge supply tank in which the thickened sludge may vary as to percentage of solids, a multiple cylinder plunger pump having check valved inlets and outlets for the respective cylinders, driving means for said pump, inlet and outlet manifolds to which the respective inlets and outlets are connected, a tank constituting a source of sludge, a connection from said source to one end of said inlet manifold, a cut-off valve in said last-mentioned connection, a source of secondary liquid, a connection from said source of secondary liquid to the other end of said inlet manifold, a cut-off valve in said last-mentioned connection, and cut-off valves in said inlet manifold intermediate the junctures of said inlet manifold with the respective inlets, whereby the operation of said cut-off valves causes selective cylinders to pump either sludge or secondary liquid depending upon the percent of solids in said thickened sludge to control the ratio of sludge to secondary liquid in the outlet manifold while maintaining a constant flow through each cylinder.

2. A sewage treatment system according to claim 1 in which said driving means provide for at least two pump driving speeds the lowest of which produces flow through the cylinders and check-valved inlets and outlets at a velocity that keeps these parts of the sytem clean.

3. In a sewage treatment system wherein optimum operating efficiency of the system is dependent upon continuous feeding thereto of thickened raw sludge at substantially a constant solids delivery rate from a sludge supply tank in which the thickened sludge may vary as to percentage of solids, a multiple cylinder plunger pump having check valved inlets and outlets for the respective cylinders, driving means for said pump, inlet and outlet manifolds to which respective inlets and outlets of said cylinders are connected and each having first and second ends correspondingly located with respect to the several cylinders of the pump, a tank constituting a source of sludge having a connection with said first end of said inlet manifold, a cut-off valve in said last-mentioned connection, a source of a secondary liquid having a connection with the second end of said inlet manifold, a cut-off valve in said last-mentioned connection, cut-off valves in said inlet manifold intermediate the junctures of said inlet manifold with the respective inlets, a sludge discharge line connected to said first end of said outlet manifold, a cut-off valve in said sludge discharge line, a secondary liquid discharge line extended from the second end of said outlet valve and discharging to said source of secondary liquid, a cut-off valve in said secondary liquid discharge line, and cut-off valves in said outlet manifold intermediate the junctures of said outlet manifold with the respective outlets, whereby operation of said cut-off valves causes selective cylinders to pump either sludge or secondary liquid depending on the percent of solids in said thickened sludge to control the solids delivery rate through said sludge discharge line while maintaining a constant flow through each cylinder.

References Cited in the file of this patent

UNITED STATES PATENTS

| | | | |
|---|---|---|---|
| 960,249 | Beaudette | June 7, | 1910 |
| 1,049,894 | Merrill | Jan. 7, | 1913 |
| 1,061,511 | Webb | May 13, | 1913 |
| 1,304,529 | Arnold | May 27, | 1919 |
| 1,599,625 | Whitlock | Sept. 14, | 1926 |
| 1,933,641 | Schmidt | Nov. 7, | 1933 |
| 2,246,940 | Hood | June 24, | 1941 |
| 2,458,607 | Lauchenaver | Jan. 11, | 1949 |
| 2,574,685 | Baxter et al. | Nov. 13, | 1951 |
| 2,594,064 | O'Leary | Apr. 22, | 1952 |

FOREIGN PATENTS

| | | | |
|---|---|---|---|
| 456,307 | France | June 16, | 1913 |
| 71,962 | Norway | Apr. 14, | 1947 |